(12) United States Patent
Shin et al.

(10) Patent No.: US 11,661,927 B2
(45) Date of Patent: May 30, 2023

(54) DRIVING DEVICE INCLUDING SHAPE MEMORY ALLOY

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Bongsu Shin, Seoul (KR); Jesung Koh, Suwon-si (KR); Hongseok Lee, Seoul (KR); Dongjin Kim, Suwon-si (KR); Baekgyeom Kim, Suwon-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/477,829

(22) Filed: Sep. 17, 2021

(65) Prior Publication Data

US 2022/0154703 A1    May 19, 2022

(30) Foreign Application Priority Data

Nov. 18, 2020 (KR) .......................... 10-2020-0154351
Apr. 2, 2021 (KR) .......................... 10-2021-0043510

(51) Int. Cl.
*F03G 7/06* (2006.01)
(52) U.S. Cl.
CPC ....... *F03G 7/06143* (2021.08); *F03G 7/0636* (2021.08); *F03G 7/0665* (2021.08)

(58) Field of Classification Search
CPC ................... F03G 7/0614–0615; F03G 7/065
See application file for complete search history.

(56) References Cited

U.S. PATENT DOCUMENTS

| 2009/0311071 A1* | 12/2009 | Allen ...................... F16B 27/00 |
| | | 411/172 |
| 2010/0212312 A1* | 8/2010 | Rudduck ................. F03G 7/065 |
| | | 60/527 |

(Continued)

FOREIGN PATENT DOCUMENTS

| CA | 2735308 A1 * | 9/2012 | ............ B25J 9/1085 |
| DE | 10155119 A1 * | 5/2003 | ............... B64C 3/48 |

OTHER PUBLICATIONS

Scire Mammano et al., "Modelling, simulation and characterization of a linear shape memory actuator with compliant bow-like architecture," Journal of Intelligent Material Systems and Structures, vol. 26, No. 6, pp. 718-729, 2015, DOI: 10.1177/1045389X14560359.

*Primary Examiner* — Laert Dounis
(74) *Attorney, Agent, or Firm* — Sughrue Mion, PLLC

(57) ABSTRACT

A driving device includes a first driving element and a first flexible structure. The first driving element includes a first wire extending in a first direction and includes a shape memory alloy. The first flexible structure has a certain width in a second direction perpendicular to the first direction, and when the first wire contracts in the first direction, the first flexible structure has a height increasing in a third direction perpendicular to both the first direction and the second direction. The driving device further includes a second driving element including a second wire and a second flexible structure, the second wire extending in the first direction and including a shape memory alloy. The second flexible structure has a certain width in the second direction, (Continued)

and when the second wire contracts in the first direction, the second flexible structure has a height increasing in the third direction.

22 Claims, 18 Drawing Sheets

(56) References Cited

U.S. PATENT DOCUMENTS

| | | |
|---|---|---|
| 2012/0241312 A1 | 9/2012 | Keefe et al. |
| 2019/0203701 A1 | 7/2019 | Motzki et al. |
| 2020/0041872 A1 | 2/2020 | Köpfer |
| 2020/0125227 A1* | 4/2020 | Shin .................. G06T 19/006 |
| 2021/0132396 A1 | 5/2021 | Shin et al. |
| 2022/0252056 A1* | 8/2022 | Müller .................. F03G 7/0616 |

* cited by examiner

DRIVING DEVICE INCLUDING SHAPE MEMORY ALLOY

CROSS-REFERENCE TO RELATED APPLICATIONS

This application is based on and claims priority under 35 U.S.C. § 119 to Korean Patent Application No. 10-2020-0154351 filed on Nov. 18, 2020 and Korean Patent Application No. 10-2021-0043510 filed on Apr. 2, 2021, in the Korean Intellectual Property Office, the disclosures of which are incorporated by reference herein in their entirety.

BACKGROUND

1. Field

The disclosure relates to a driving device including a shape memory alloy, and more particularly, to a driving device that enables a linear motion of an object according to contraction of a shape memory alloy.

2. Description of the Related Art

Recently, the demand for an augmented reality (AR) device that combines and provides a virtual image and a real-world image to a user has increased. An AR device may include a driving device for changing a position of a light source in order to focus a virtual image on multiple focal points. In addition, a smartphone camera may include a certain driving device for implementing an optical image stabilization (OIS) technology for preventing image shake due to hand shake.

As such, in industries to which various mechanical devices or electronic devices such as AR devices, smart phones, and robotic arms are applied, a driving device for transmitting a certain driving force to an object may be required.

A voice coil motor (VCM), a piezo actuator, etc. are known as driving devices for transmitting a driving force to an object and changing a position of the object. However, the VCM and the piezo actuator have limitations such as a low output. In general, the size of the driving device may be increased in order to increase the output of the driving device, but in this case, power consumption may greatly increase because the driving device is excessively heavy.

SUMMARY

Provided is a driving device including a shape memory alloy.

Additional aspects will be set forth in part in the description which follows and, in part, will be apparent from the description, or may be learned by practice of the presented embodiments of the disclosure.

According to an aspect of the disclosure, there is provided a driving device including: a first driving element including a first wire and a first flexible structure, the first wire extending in a first direction and including a first shape memory alloy, the first flexible structure having a first width in a second direction perpendicular to the first direction, and the first flexible structure configured to have a height increasing in a third direction perpendicular to both the first direction and the second direction based on a contraction of the first wire in the first direction; and a second driving element including a second wire and a second flexible structure, the second wire extending in the first direction and including a second shape memory alloy, the second flexible structure having a second width in the second direction, and having a height increasing in the third direction based on a contraction of the second wire in the first direction, wherein the first driving element and the second driving element are stacked in the third direction.

The first flexible structure may be supported by both ends of the first wire in the first direction, wherein the first flexible structure may be configured to surround upper and lower portions of the first wire in the third direction, wherein the second flexible structure may be supported by both ends of the second wire in the first direction, and wherein the second flexible structure may be configured to surround upper and lower portions of the second wire in the third direction.

The first flexible structure may include openings through which the first wire is exposed to outside in the second direction, and wherein the second flexible structure may include openings through which the second wire is exposed to outside in the second direction.

The first flexible structure may include a first upper flexible sheet and a first lower flexible sheet supported by both ends of the first wire in the first direction, wherein the first upper flexible sheet may cover an upper portion of the first wire in the third direction, wherein the first lower flexible sheet may cover a lower portion of the first wire in the third direction, and wherein the second flexible structure may include a second upper flexible sheet and a second lower flexible sheet supported by both ends of the second wire in the first direction, wherein the second upper flexible sheet may cover an upper portion of the second wire in the third direction, and wherein the second lower flexible sheet may cover a lower portion of the second wire in the third direction.

At least one first protrusion may be formed on each end of one of the first upper flexible sheet and the first lower flexible sheet in the first direction, and at least one first insertion hole into which the at least one first protrusion is inserted is formed in each end of the other one in the first direction, and wherein at least one second protrusion may be formed on each end of one of the second upper flexible sheet and the second lower flexible sheet in the first direction, and at least one second insertion hole into which the at least one second protrusion is inserted is formed in each end of the other one in the first direction.

The first flexible structure and the second flexible structure may each include an insulating flexible material.

The driving device may further include a power supply device configured to supply power to the first driving element and the second driving element so that the first wire and the second wire contract in the first direction.

The driving device may further include a connection conducting wire configured to electrically connect the first wire to the second wire.

The power supply device may be configured to independently apply the power to the first driving element and the second driving element.

The driving device may further include a housing including a space in which the first driving element and the second driving element are provided, wherein, based on a change in heights of the first flexible structure and the second flexible structure in the third direction, a height of the housing changes in the third direction.

The housing may include a structure in which an inner flexible base layer and a shield layer on an outer surface of the inner flexible base layer are stacked.

The shield layer may include a plurality of sub-shield layers spaced apart from each other on the outer surface of the inner flexible base layer, and wherein the housing may include an origami structure formed by folding the inner flexible base layer in a spaced region between the plurality of sub-shield layers.

The inner flexible base layer may include at least one of polyimide (PI) and polyethylene terephthalate (PET).

The shield layer may include at least one of an FR-4 sheet, polyethylene naphthalate (PEN), polyethylene terephthalate (PET), and carbon.

The housing may include a lower housing, an upper housing on the lower housing, and a connection structure connecting the lower housing and the upper housing, and the connection structure may have a height changing in the third direction based on the change in the heights of the first flexible structure and the second flexible structure in the third direction.

The connection structure may include at least four leg portions configured to be partially folded so that degrees of folding vary based on a change in heights of the first driving element and the second driving element in the third direction change.

The driving device may further include an upper substrate provided on the first driving element and the second driving element and inside the upper housing to support an object, and a lower substrate provided to support the first driving element and the second driving element and inside the lower housing.

The driving device may further include a cross-shaped driving element provided on the first driving element and the second driving element and inside the housing, wherein the cross-shaped driving element includes a cross-shaped flexible structure including an upper flexible sheet and a lower flexible sheet facing each other and each having a cross shape, a third wire provided in a width space of a cross internal space of the cross-shaped flexible structure, and a fourth wire provided in a length space of the cross internal space.

Each of the third wire and the fourth wire may include a meander pattern.

The first driving element and the second driving element may each be implemented as a cross-shaped driving element, the first driving element further includes a third wire intersecting the first wire, and the second driving element further includes a fourth wire intersecting the second wire, and wherein the first flexible structure and the second flexible structure each may have a cross shape in the first direction and the second direction, the first wire and the third wire are respectively provided in a length space and a width space of the first flexible structure, and the second wire and the fourth wire are respectively provided in a length space and a width space of the second flexible structure.

Each of the first wire, the second wire, the third wire, and the fourth wire may include a meander pattern.

According to another aspect of the disclosure, there is provided a driving device including: one or more driving elements, wherein each of the one or more driving elements includes a wire extending in a first direction and including a first shape memory alloy, and a flexible structure having an upper portion provided above the wire, and a lower portion provided below the wire, wherein a first end of the wire is connected to the flexible structure at a first position, and a second end of the wire is connected to the flexible structure at a second position, and wherein the flexible structure is configured to expand or contract in a second direction based on a contraction or expansion of the wire in the first direction.

According to another aspect of the disclosure, there is provided a driving device including: a power supply; one or more driving elements, each including: a wire extending in a first direction and including a first shape memory alloy, and a flexible structure having an upper portion provided above the wire, and a lower portion provided below the wire; and a controller configured to supply from the power supply to the wire, wherein the flexible structure is configured to expand or contract in a second direction based on a contraction or an expansion of the wire in the first direction, and wherein the contraction or the expansion of the wire in the first direction is based on a flow of current through the wire based on the power supply.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
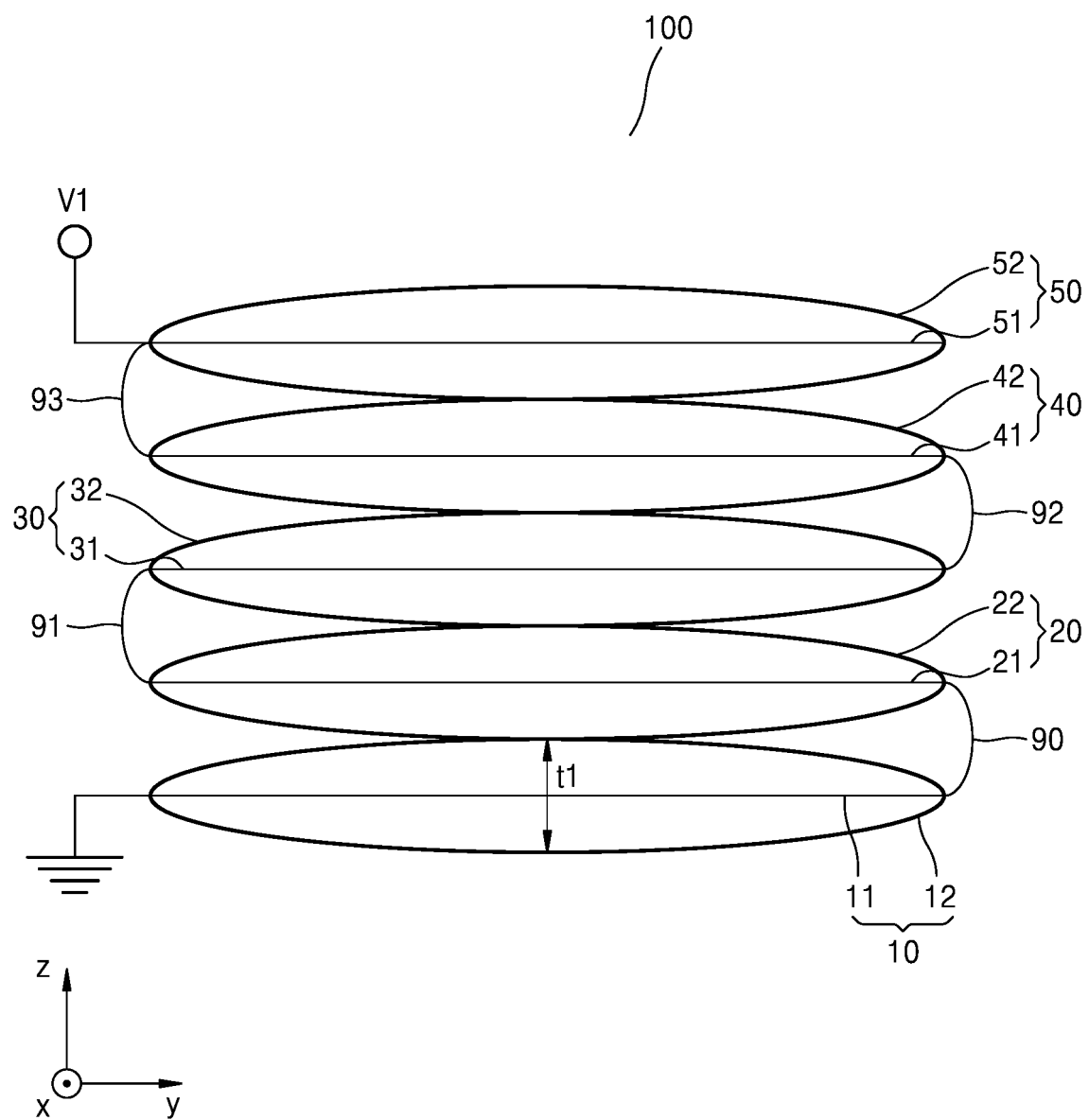
FIG. 1 is a side cross-sectional view schematically illustrating a first state of a driving device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, a size or a thickness of each element in the drawings may be exaggerated for clarity and convenience of explanation.

Although the terms first, second, etc. may be used herein to describe various elements, the terms do not limit the components. These terms are only used to distinguish one element from another.

Hereinafter, the expression "above" or "on" may indicate not only a case in which an element is directly above and in contact with another element, but also a case in which the element is above but is not in contact with the other element. As used herein, the singular terms "a" and "an" are intended to include the plural forms as well, unless the context clearly indicates otherwise.

It will be further understood that when a part "includes" or "comprises" an element throughout the specification, unless otherwise defined, the part may further include other elements, not excluding the other elements.

The term "the" and other equivalent determiners may correspond to a singular referent or a plural referent.

Figure 2:
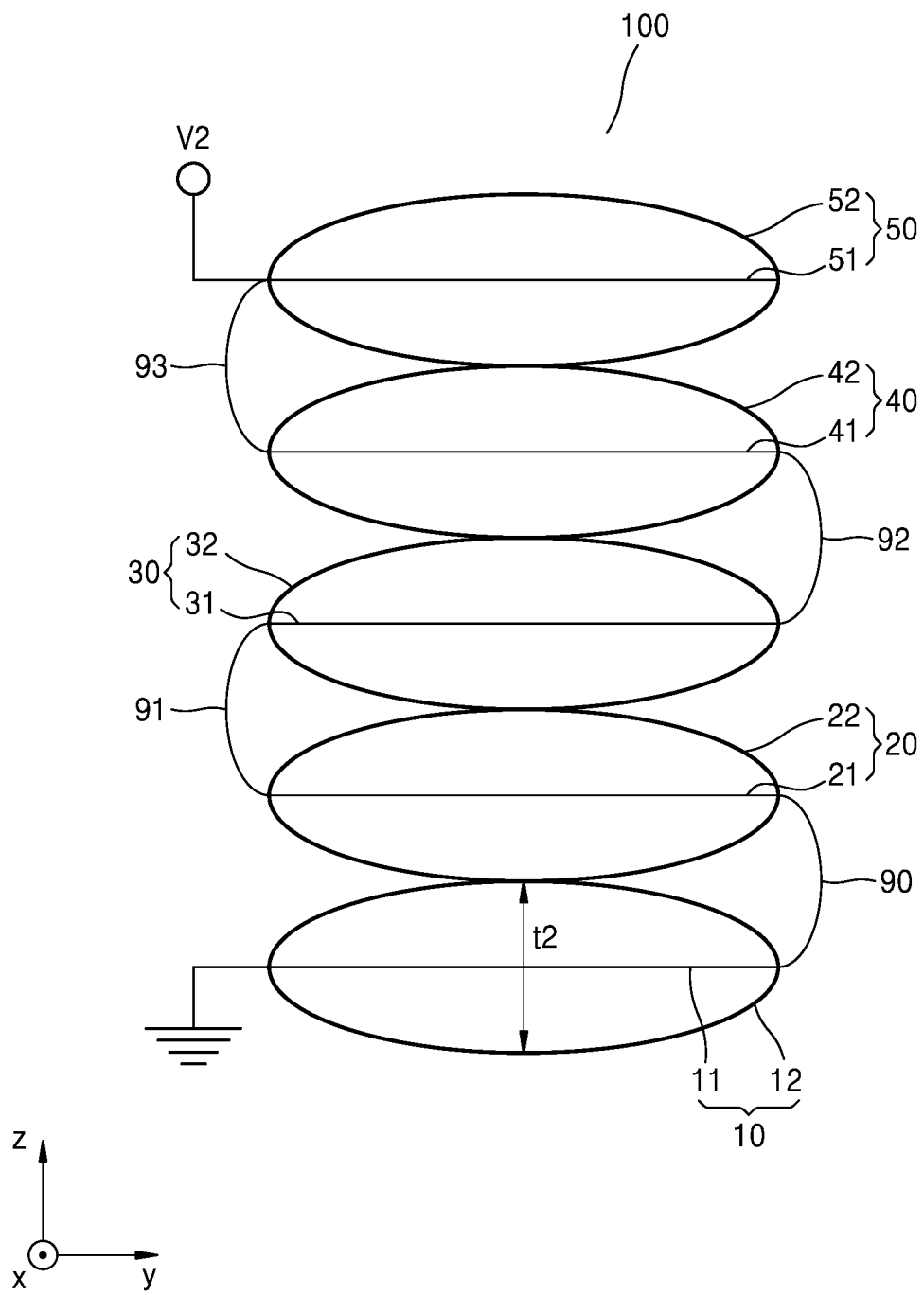
FIG. 2 is a side cross-sectional view schematically illustrating a second state of the driving device of FIG. 1 according to another example embodiment.

FIG. 1 is a side cross-sectional view schematically illustrating a first state of a driving device 100 according to an example embodiment. FIG. 2 is a side cross-sectional view schematically illustrating a second state of the driving device 100 of FIG. 1.

Referring to FIGS. 1 and 2, the driving device 100 may include a structure in which a plurality of driving elements 10, 20, 30, 40, and 50 are stacked. The plurality of driving elements 10, 20, 30, 40 and 50 may include a first driving element 10, a second driving element 20, a third driving element 30, a fourth driving element 40, and a fifth driving element 50. However, the disclosure is not limited thereto, and the driving device 100 may include more than five driving elements or less than five driving elements. Configuration of the plurality of driving elements 10, 20, 30, 40, and 50 may be substantially the same as each other.

The first driving element 10 may be provided with a first wire 11 formed to extend in a first direction (y-axis direction) and including a shape memory alloy, and a first flexible structure 12 having a certain width in a second direction (x-axis direction) perpendicular to the first direction (y-axis direction) and having an increasing height t1 in a third direction (z-axis direction) perpendicular to both the first direction (y-axis direction) and the second direction (x-axis direction) as the first wire 11 contracts in the first direction (y-axis direction).

The second driving element 20 may be provided with a second wire 21 formed to extend in the first direction (y-axis direction) and including a shape memory alloy and a second flexible structure 22 having a certain width in the second direction (x-axis direction) and having an increasing height in the third direction (z-axis direction) as the second wire 21 contracts in the first direction (y-axis direction).

Similar to the first driving element 10 and the second driving element 20, the third driving element 30 may include a third wire 31 and a third flexible structure 32, the fourth driving element 40 may include a fourth wire 41 and a fourth flexible structure 42, and the fifth driving element 50 may include a fifth wire 51 and a fifth flexible structure 52.

The first driving element 10, the second driving element 20, the third driving element 30, the fourth driving element 40, and the fifth driving element 50 may be sequentially stacked in the third direction (z-axis direction).

The driving device 100 may further include a first connection conducting wire 90 electrically connecting the first wire 11 and the second wire 21. The first connection conducting wire 90 may extend from the first wire 11, be withdrawn to the outside of the first flexible structure 12, and be electrically connected to the second wire 21 inside the second flexible structure 22. That is, the first connection conducting wire 90 may be provided outside of the first flexible structure 12, and be electrically connected to the second wire 21, which is provided inside the second flexible structure 22. In addition, the driving device 100 may include a second connection conducting wire 91 that electrically connects the second wire 21 and the third wire 31, a third connection conducting wire 92 that electrically connects the third wire 31 and the fourth wire 41, and a fourth connection conducting wire 93 that electrically connects the fourth wire 41 and the fifth wire 51. The second connection conducting wire 91, the third connection conducting wire 92, and the fourth connection conducting wire 93 may be configured similarly to the first connection conducting wire 90.

The first connection conducting wire 90, the second connection conducting wire 91, the third connection conducting wire 92, and the fourth connection conducting wire 93 may include a conductive material. The first wire 11, the second wire 21, the third wire 31, the fourth wire 41, and the fifth wire 51 may be connected in series with each other by the first connection conducting wire 90, the second connection conducting wire 91, the third connection conducting wire 92, and the fourth connection conducting wire 93. However, the disclosure is not limited thereto, and the driving device 100 may not include the plurality of connection conducting wires 90, 91, 92, and 93, but the first wire 11, the second wire 21, and the third wire 31, the fourth wire 41 and the fifth wire 51 may be electrically separated from each other. For example, according to another example embodiment, various configuration of connection conducting wires may be provided to connect respectively to the first wire 11, the second wire 21, and the third wire 31, the fourth wire 41 and the fifth wire 51.

The driving device 100 may further include a power supply device for supplying electrical energy to the first driving element 10 and the second driving element 20 so that the first wire 11 and the second wire 21 contract in the first direction (y-axis direction). The power supply device may also supply electric energy to the third driving element 30, the fourth driving element 40, and the fifth driving element 50.

The electric energy supplied from the power supply device may be transferred to the first wire 11, the second wire 21, the third wire 31, the fourth wire 41, and the fifth wire 51 that include a shape memory alloy. For example, current may be supplied to the first wire 11, the second wire 21, the third wire 31, the fourth wire 41, and the fifth wire 51. Each of the first wire 11, the second wire 21, the third wire 31, the fourth wire 41 and the fifth wire 51 may include the shape memory alloy to have a characteristic such that their lengths shrink by a thermal change caused when current is applied thereto. As the shape memory alloy, a titanium-nickel alloy or a copper-zinc-aluminum alloy (20~25% of zinc and 4~6% of aluminum) of titanium and nickel in a 1:1 ratio may be used.

The first wire 11, the second wire 21, the third wire 31, the fourth wire 41, and the fifth wire 51 may contract in the first direction (y-axis direction) by the current supplied from the power supply device. As shown in FIGS. 1 and 2, current of the same intensity may be supplied from the power supply device to the first wire 11, the second wire 21, the third wire 31, the fourth wire 41 and the fifth wire 51 that are connected in series. In this case, a degree of contraction of the first wire 11, the second wire 21, the third wire 31, the fourth wire 41, and the fifth wire 51 may be substantially the same as each other.

However, the disclosure is not limited thereto. According to another example embodiment, in a case in which the driving device 100 does not include the plurality of connection conducting wires 90, 91, 92, and 93, and when the first wire 11, the second wire 21, the third wire 31, the fourth wire 41, and the fifth wire 51 are electrically separated, the power supply device may independently supply current to the first wire 11, the second wire 21, the third wire 31, the fourth wire 41, and the fifth wire 51. For example, current supplied to at least two wires among the first wire 11, the second wire 21, the third wire 31, the fourth wire 41, and the fifth wire 51 may have different intensity. In this case, the degree of contraction of the first wire 11, the second wire 21, the third wire 31, the fourth wire 41, and the fifth wire 51 may be different according to the intensity of current.

Referring to FIGS. 1 and 2, heights of the first flexible structure 12, the second flexible structure 22, the third flexible structure 32, the fourth flexible structure 42, and the fifth flexible structure 52 may increase in the third direction (z-axis direction) by the contraction of the first wire 11, the second wire 21, the third wire 31, the fourth wire 41 and the fifth wire 51.

For example, as shown in FIG. 1, when a first voltage V1 having a relatively small magnitude is applied from the power supply device to the first wire 11, the second wire 21, the third wire 31, the fourth wire 41 and the fifth wire 51, the first wire 11 may contract by a certain amount in the first direction (y-axis direction), and the first flexible structure 12 may have the first height t1 in the third direction (z-axis direction). According to an example embodiment, the first wire 11 may contract based on a current flowing through the first wire 11. For example, the contraction of the first wire 11 may be proportion to the flow of the current or the voltage. In this case, the second flexible structure 22, the third flexible structure 32, the fourth flexible structure 42 and the fifth flexible structure 52 may all have the first height t1. As described above, when the first flexible structure 12 has the first height t1, the driving device 100 may be in the first state.

Meanwhile, as shown in FIG. 2, when a second voltage V2 having a greater intensity than that of the first voltage V1 is applied from the power supply device to the first wire 11, the second wire 21, the third wire 31, the fourth wire 41 and the fifth wire 51, the first wire 11 may further contract by a certain amount in the first direction (y-axis direction), and the first flexible structure 12 may have a second height t2 greater than the first height t1 in the third direction (z-axis direction). According to an example embodiment, the first wire 11 may contract based on a current flowing through the first wire 11. For example, the contraction of the first wire 11 may be proportion to the flow of the current or the voltage. In this case, the second flexible structure 22, the third flexible structure 32, the fourth flexible structure 42 and the fifth flexible structure 52 may all have the second height t2. As described above, when the first flexible structure 12 has the second height t2, the driving device 100 may be in the second state.

The overall height of the driving device 100 in the second state in the third direction (z-axis direction) is greater than the overall height of the driving device 100 in the first state in the third direction (z-axis direction). The height of the driving device 100 may be adjusted in the third direction (z-axis direction) by adjusting current or voltage supplied from the power supply device, and accordingly, the driving device 100 may do a contraction-relaxation motion in the third direction (z-axis direction). A driving force may be transferred to an external object by the contraction-relaxation motion of the driving device 100 in the third direction (z-axis direction). For example, the driving device 100 may cause the external object to linearly move in the third direction (z-axis direction).

Meanwhile, according to another example embodiment, in a case in which the driving device 100 does not include the plurality of connection conducting wires 90, 91, 92, and 93, the first wire 11, the second wire 21, the third wire 31, the fourth wire 41, and the fifth wire 51 may be electrically separated from each other. In this case, current supplied to at least two wires among the first wire 11, the second wire 21, the third wire 31, the fourth wire 41, and the fifth wire 51 may have different intensity. In this case, the degree of contraction of the first wire 11, the second wire 21, the third wire 31, the fourth wire 41, and the fifth wire 51 may be different according to the intensity of the current, and accordingly, the first flexible structure 12, the second flexible structure 22, the third flexible structure 32, the fourth flexible structure 42 and the fifth flexible structure 52 may also have different heights.

Figure 3:
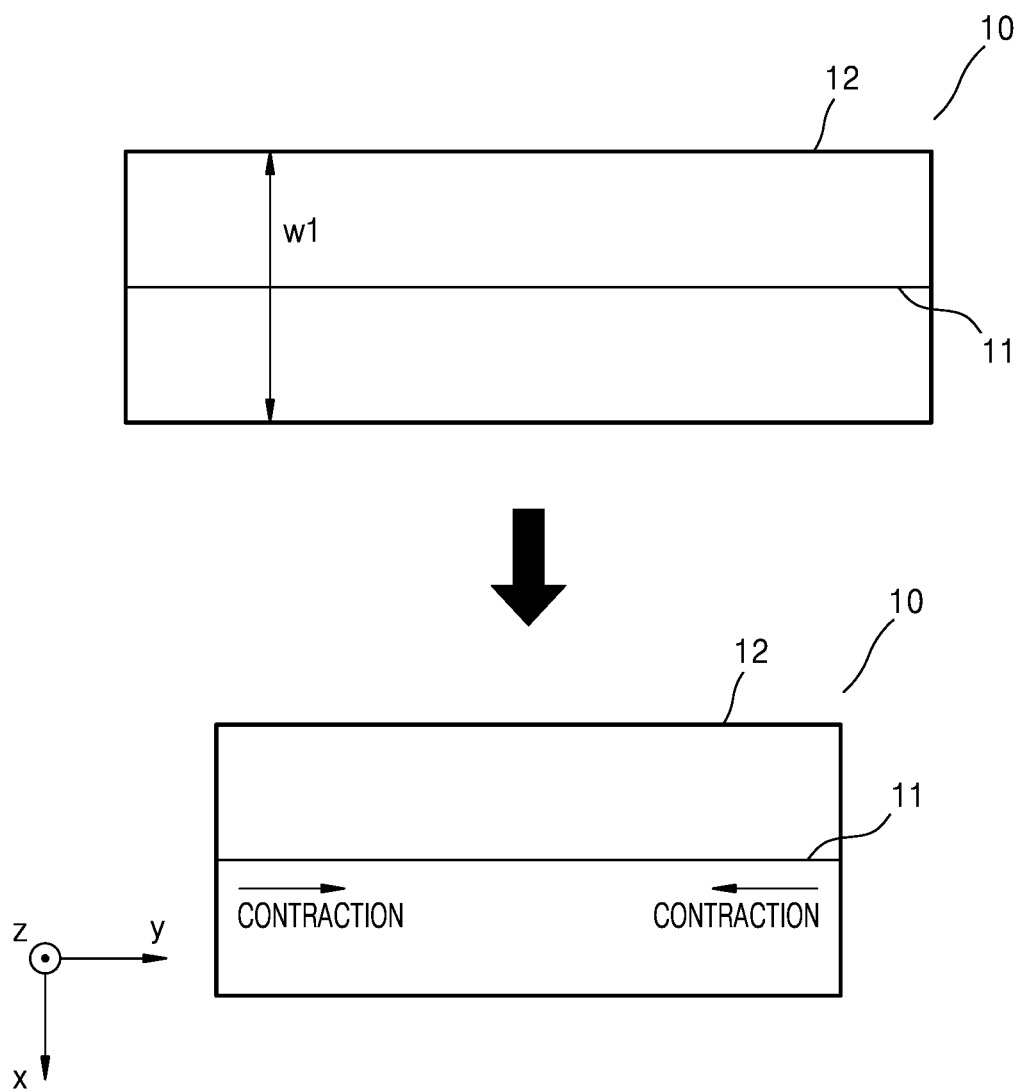
FIG. 3 illustrates a state in which a first wire included in the driving device of FIG. 1 contracts according to another example embodiment.
Figure 4:
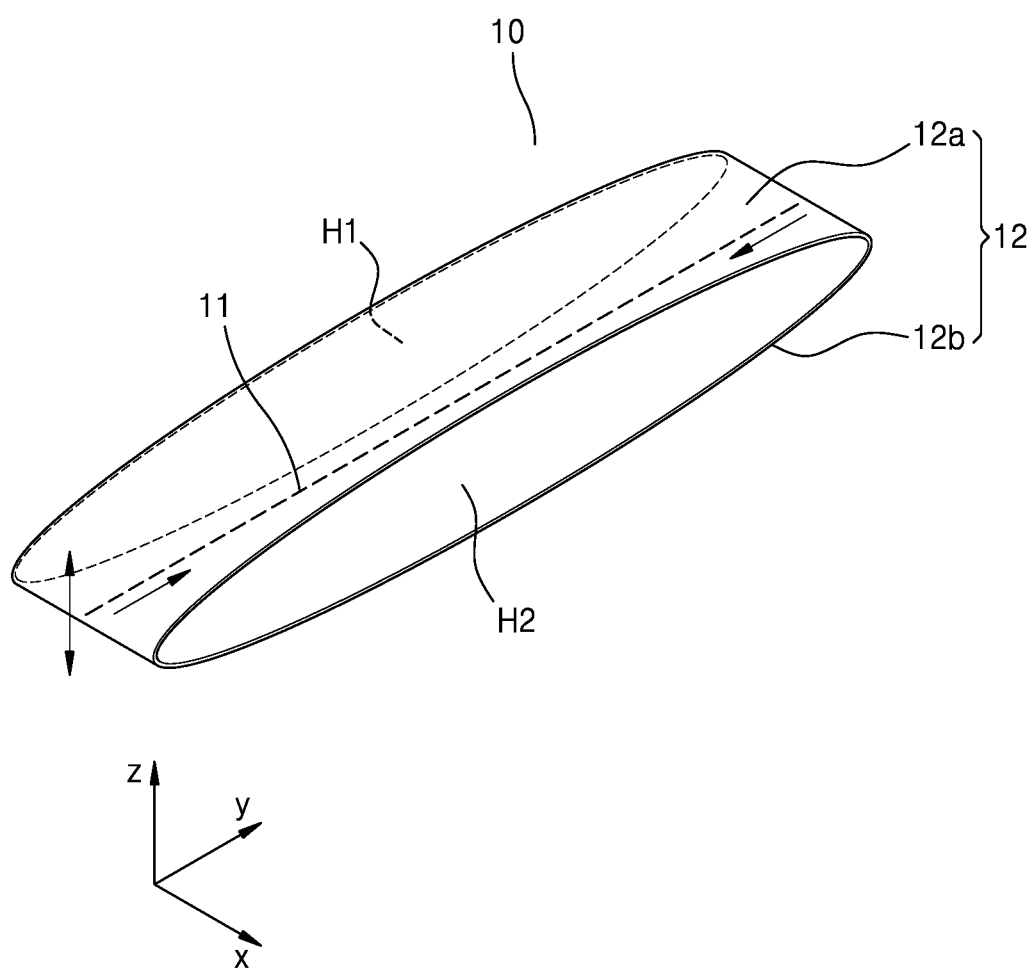
FIG. 4 is a perspective view schematically illustrating a configuration of a first driving element included in the driving device of FIG. 1 according to another example embodiment.

FIG. 3 illustrates a state in which the first wire 11 included in the driving device 100 of FIG. 1 contracts according to an example embodiment. FIG. 4 is a perspective view schematically illustrating a configuration of the first driving element 10 included in the driving device 100 of FIG. 1 according to an example embodiment.

The following description of the first wire 11 may be substantially equally applied to the second wire 21, the third wire 31, the fourth wire 41 and the fifth wire 51 of FIG. 1. In addition, the following description of the first driving element 10 may be substantially equally applied to the second driving element 20, the third driving element 30, the fourth driving element 40, and the fifth driving element 50 of FIG. 1.

Referring to FIG. 3, the first driving element 10 may include the first wire 11 formed to extend in the first direction (y-axis direction) and the first flexible structure 12 having a certain first width w1 in the second direction (x-axis direction). When a current is supplied to the first wire 11 from a power supply device, the first wire 11 may contract in the first direction (y-axis direction), and accordingly, a length of the flexible structure 12 in the first direction (y-axis direction) viewed in the third direction (z-axis direction) may also be reduced.

Referring to FIG. 4, the first flexible structure 12 may be supported by both ends of the first wire 11 in the first direction (y-axis direction), and may be formed to surround upper and lower portions of the first wire 11 in the third direction (z-axis direction). In addition, openings H1 and H2 through which the first wire 11 is exposed to the outside may be provided in both ends of the first flexible structure 12 in the second direction (x-axis direction). As described above, the first flexible structure 12 may be formed so as not to cover both sides of the first wire 11 in the second direction (x-axis direction). However, the present disclosure is not limited thereto, and the first flexible structure 12 may be formed to cover both sides of the first wire 11 in the second direction (x-axis direction).

The first flexible structure 12 may include an insulating flexible material. Therefore, a leakage of the current flowing in the first wire 11 may be prevented by the insulating first flexible structure 12. For example, the first flexible structure 12 may include at least one of a FR-4 sheet, polyethylene naphthalate (PEN), polyethylene terephthalate (PET), and carbon. FR-4 sheet includes a material called 'glass-reinforced epoxy laminate material'.

When the current is supplied to the first wire 11 from the power supply device, the length of the first flexible structure 12 in the first direction (y-axis direction) may be reduced, and the height thereof in the third direction (z-axis direction) may increase.

For example, the first flexible structure 12 may include a first upper flexible sheet 12a supported by the both ends of the first wire 11 in the first direction (y-axis direction) and covering the upper portion of the first wire 11 in the third direction (z-axis direction) and a first lower flexible sheet 12b supported by the both ends of the first wire 11 in the first direction (y-axis direction) and covering the lower portion of the first wire 11 in the third direction (z-axis direction). The first upper flexible sheet 12a and the first lower flexible sheet 12b have a bow shape and face each other.

Figure 5:
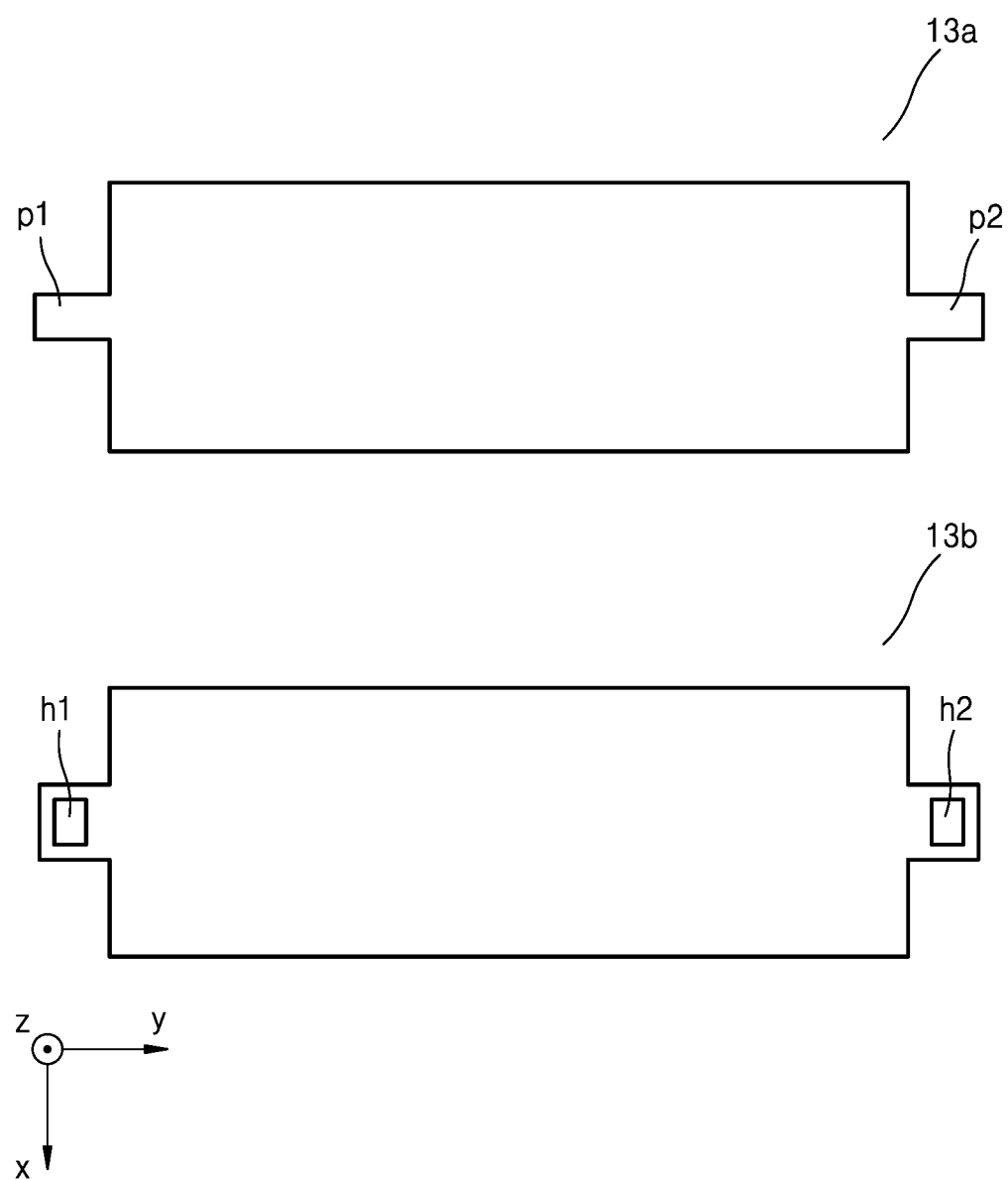
FIG. 5 schematically illustrates configurations of flexible sheets according to another example embodiment applicable to a first flexible structure of FIG. 1 according to another example embodiment.

FIG. 5 schematically illustrates configurations of flexible sheets 13a and 13b according to another example embodiment applicable to the first flexible structure 12 of FIG. 1.

The description of the flexible sheets 13a and 13b given with reference to FIG. 5 may be substantially equally applied to the second flexible structure 22, the third flexible structure 32, the fourth flexible structure 42 and the fifth flexible structure 52 of FIG. 1.

Referring to FIG. 5, at least one protrusions p1 and p2 may be formed on both ends of any one of the first upper flexible sheet 13a and the first lower flexible sheet 13b in the first direction (y-axis direction), and at least one insertion holes h1 and h2 into which the at least one protrusions p1 and p2 are respectively inserted may be formed in both ends of the other one in the other first direction (y-axis direction).

For example, the at least one protrusions p1 and p2 may be formed on both ends of the first upper flexible sheet 13a in the first direction (y-axis direction), and the at least one insertion holes h1 and h2 may be formed in both ends of the first lower flexible sheet 13b in the first direction (y-axis direction). The curved first upper flexible sheet 13a and the curved second lower flexible sheet 13b may be provided to face each other in upper and lower portions in the third direction (z-axis direction). In this case, the first protrusion p1 may be coupled to the first insertion hole h1, and the second protrusion part p2 may be coupled to the second insertion hole h2. Accordingly, the first upper flexible sheet 13a and the second lower flexible sheet 13b may be coupled to each other. According to an example embodiment, a wire, such as a first wire 11, may be provided to connect between the first protrusion p1 and the second protrusion part p2.

However, the disclosure is not limited thereto, and the at least one insertion holes h1 and h2 may be formed in both ends of the first upper flexible sheet 13a in the first direction (y-axis direction), and the at least one protrusions p1 and p2 may be formed on both ends of the second lower flexible sheet 13b in the first direction (y-axis direction).

Figure 6:
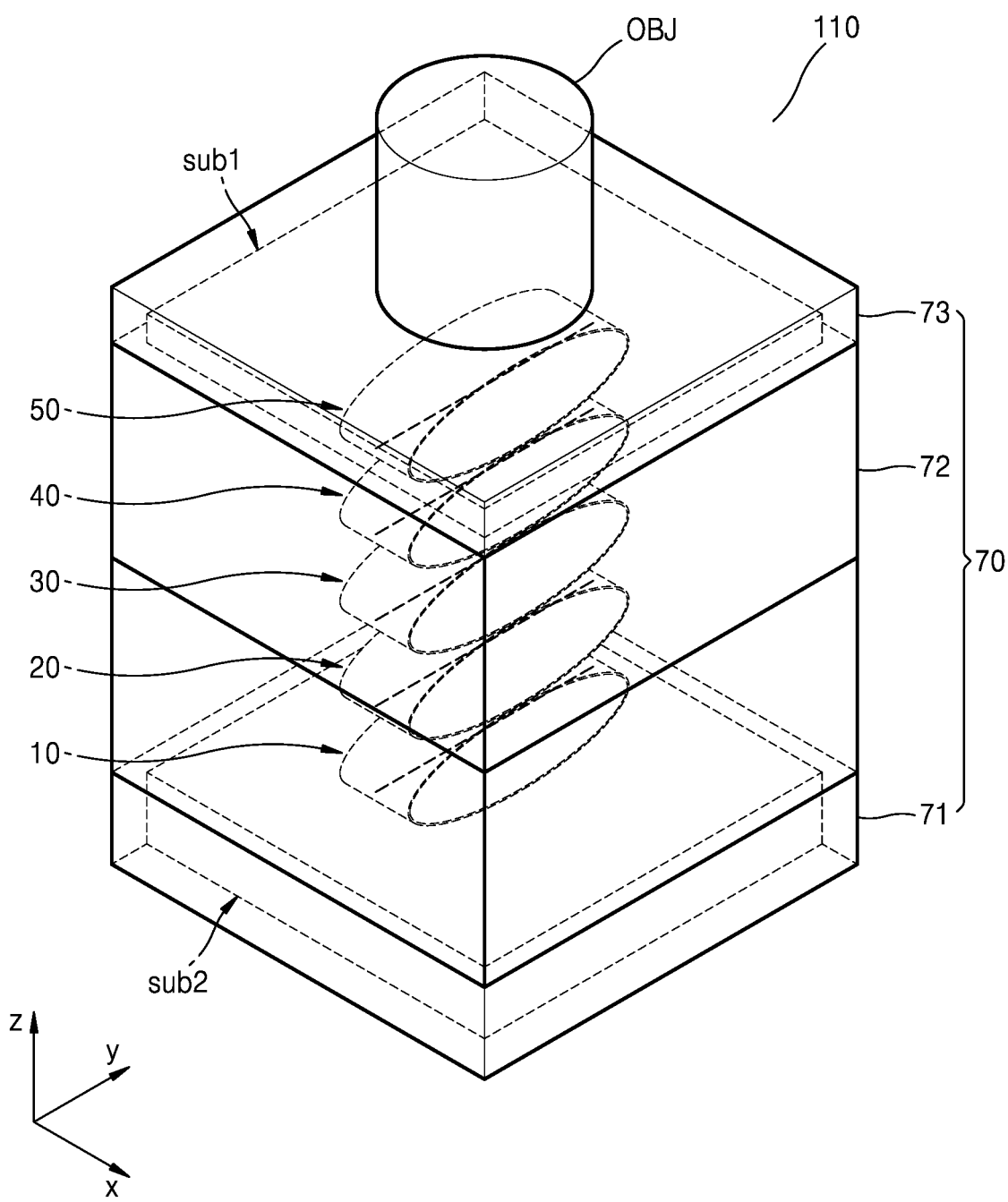
FIG. 6 schematically illustrates a first state of a driving device according to another example embodiment.
Figure 7:
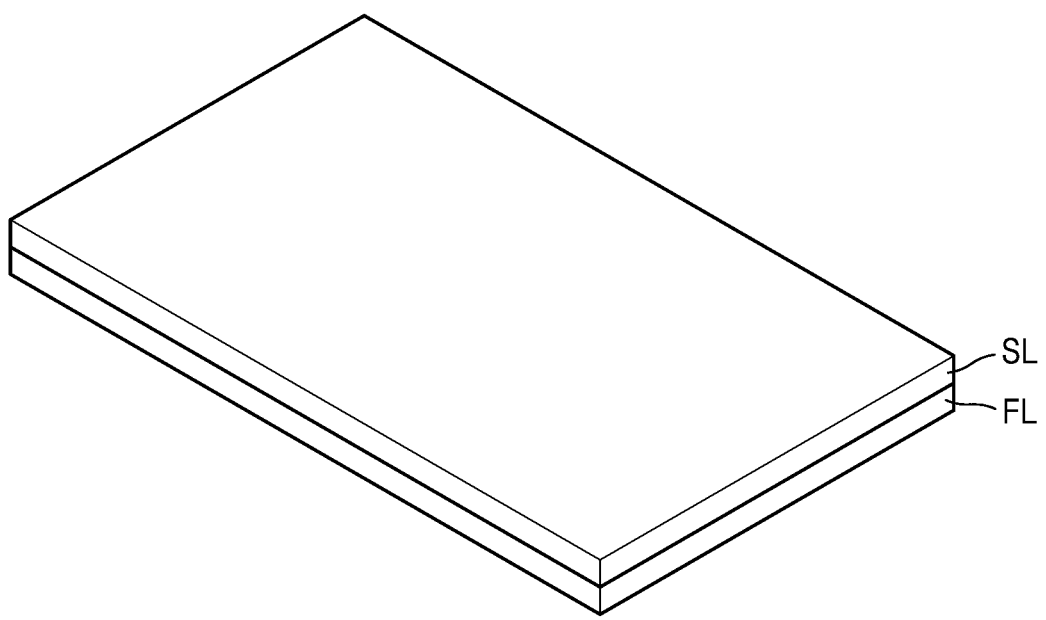
FIG. 7 is a perspective view schematically illustrating a configuration of one surface of a housing included in the driving device of FIG. 6 according to another example embodiment.
Figure 8:
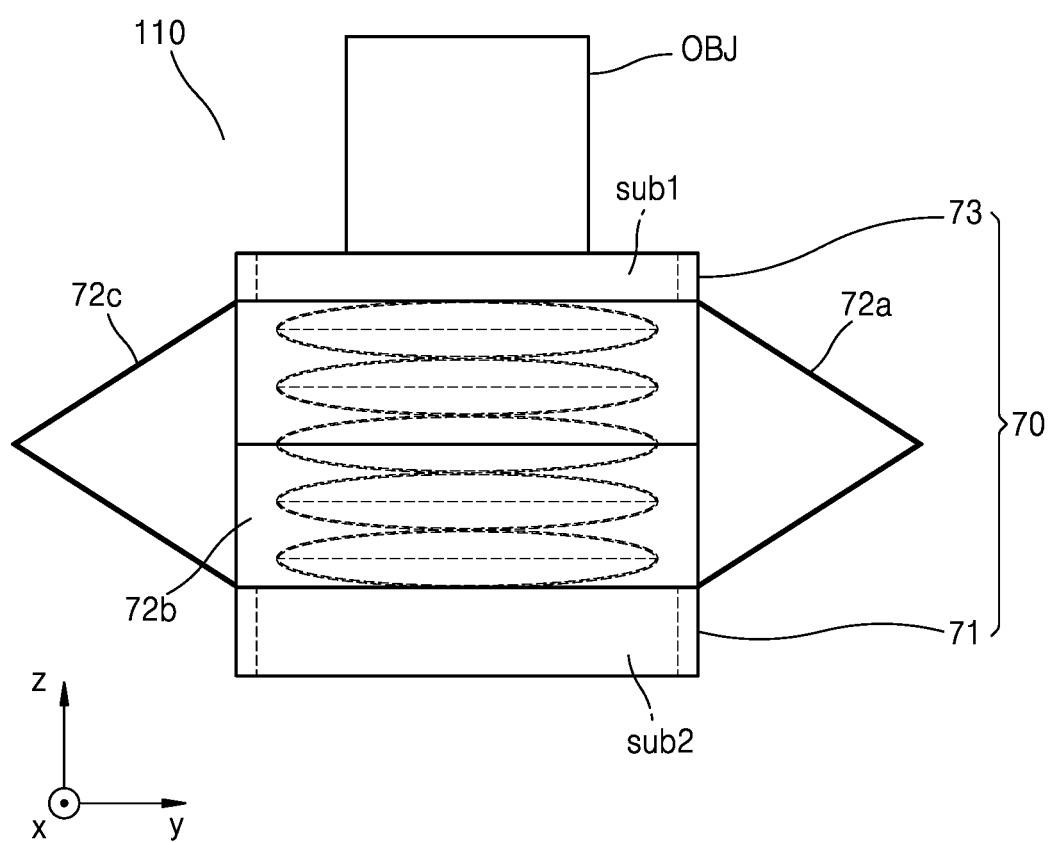
FIG. 8 schematically illustrates a second state of the driving device of FIG. 6 according to another example embodiment.
Figure 9:
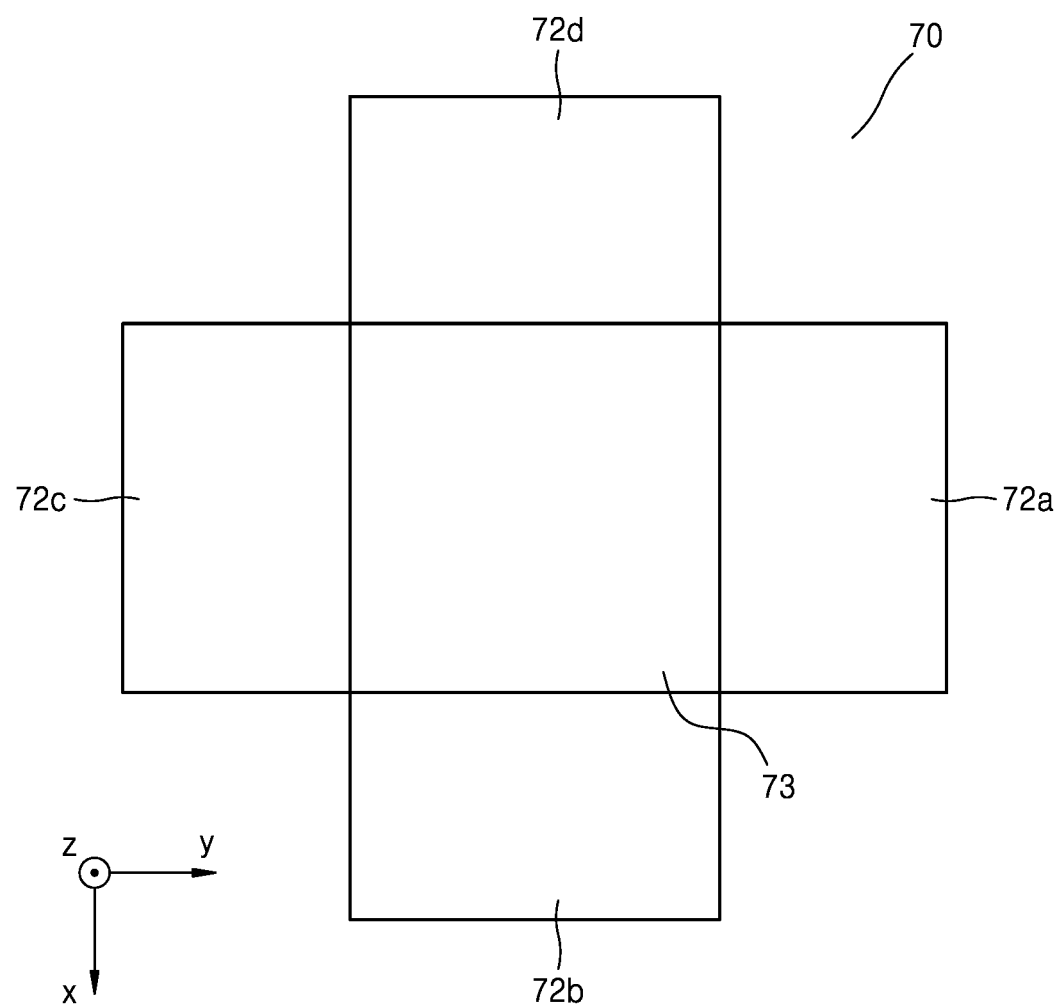
FIG. 9 is a plan view schematically illustrating configurations of a plurality of leg portions included in the driving device of FIG. 8 according to another example embodiment.
Figure 10:
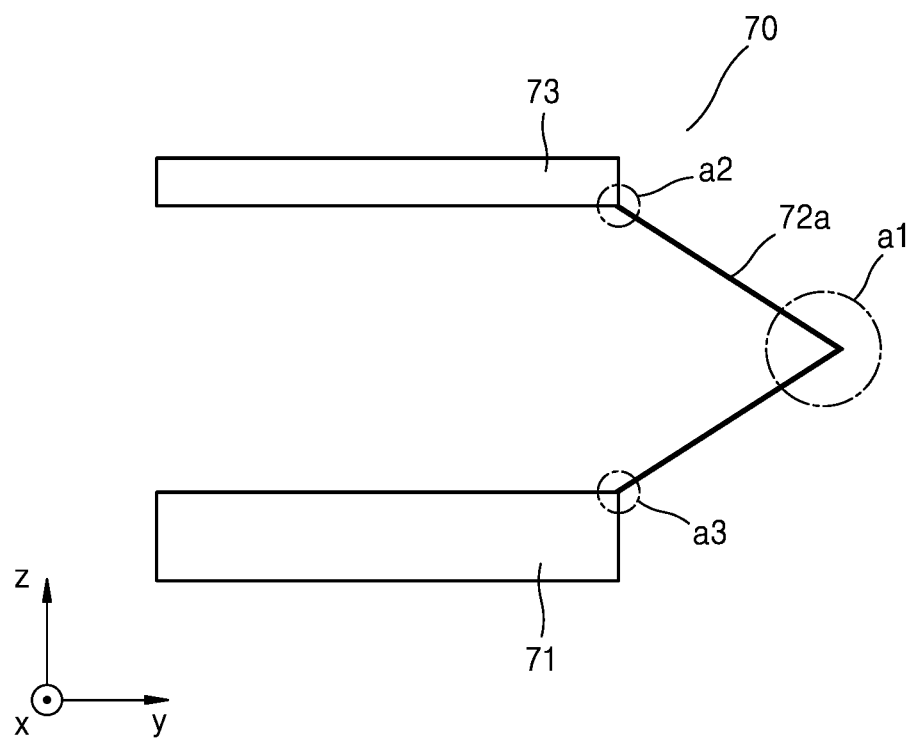
FIG. 10 illustrates a configuration of a first leg portion among the plurality of leg portions included in the driving device of FIG. 9 according to another example embodiment.
Figure 11:
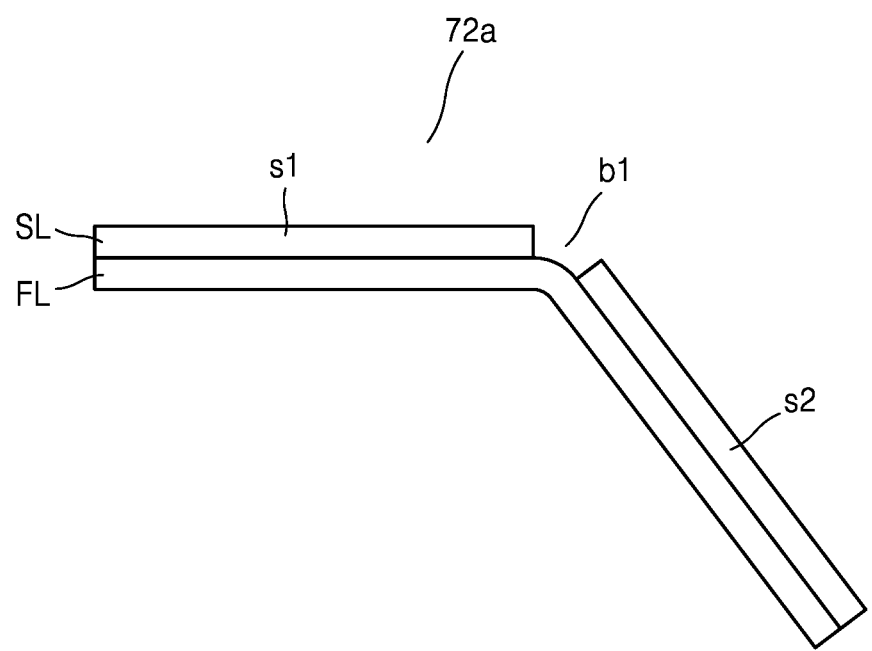
FIG. 11 is a side cross-sectional view schematically illustrating the configuration of the first leg portion among the plurality of leg portions included in the driving device of FIG. 9, according to another example embodiment.
Figure 12:
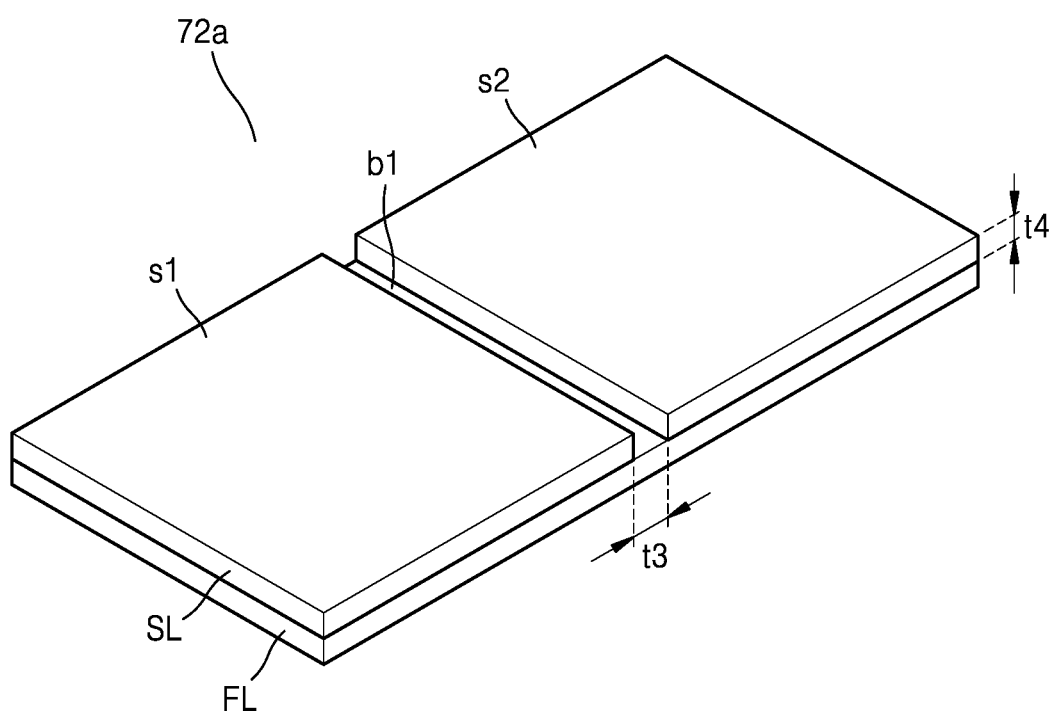
FIG. 12 is a perspective view schematically illustrating the configuration of the first leg portion among the plurality of leg portions included in the driving device of FIG. 9, according to another example embodiment.
Figure 13A:
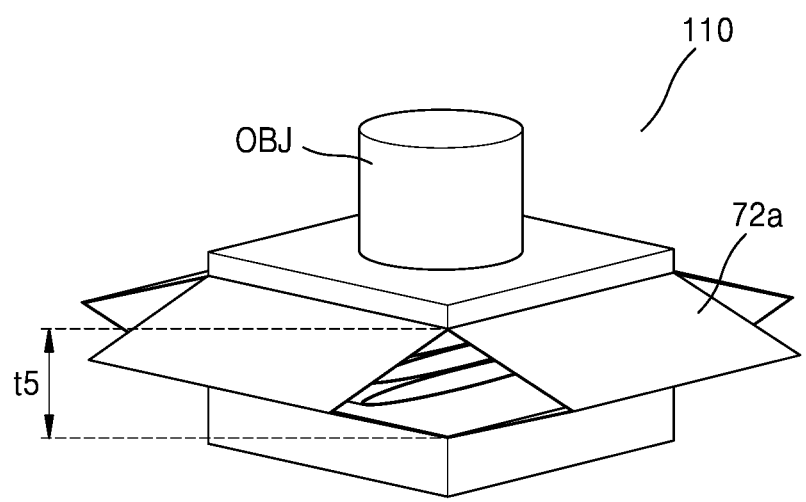
FIGS. 13A and 13B illustrate an operation of the driving device of FIG. 6 according to another example embodiment.
Figure 13B:
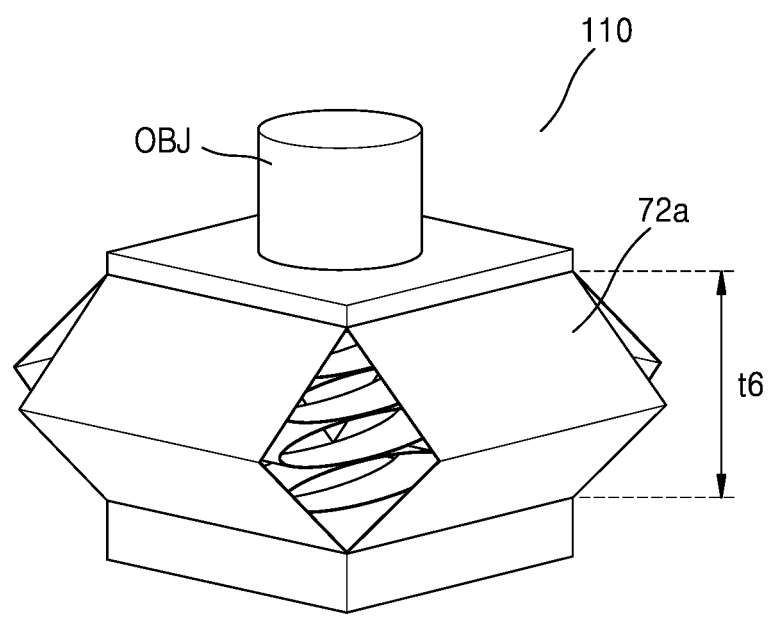

FIG. 6 schematically illustrates a first state of a driving device 110 according to another example embodiment. FIG. 7 is a perspective view schematically illustrating a configuration of one surface of a housing 70 included in the driving device 110 of FIG. 6. FIG. 8 schematically illustrates a second state of the driving device 110 of FIG. 6. FIG. 9 is a plan view schematically illustrating configurations of a plurality of leg portions 72a, 72b, 72c, and 72d included in the driving device 110 of FIG. 8. FIG. 10 illustrates a configuration of the first leg portion 72a among the plurality of leg portions 72a, 72b, 72c, and 72d of FIG. 9. FIG. 11 is a side cross-sectional view schematically illustrating the configuration of the first leg portion 72a among the plurality of leg portions 72a, 72b, 72c, and 72d of FIG. 9. FIG. 12 is a perspective view schematically illustrating the configuration of the first leg portion 72a among the plurality of leg portions 72a, 72b, 72c, and 72d of FIG. 9. FIGS. 13A and 13B illustrate an operation of the driving device 110 of FIG. 6.

The driving device 110 of FIG. 6 may be substantially the same as the driving device 100 of FIG. 1, except that the driving device 110 further includes the housing 70. With respect to descriptions of FIGS. 6, 7, 8, 9, 10, 11, 12 13A and 13B, the redundant descriptions with those of FIGS. 1 to 5 will be omitted.

The description of the first leg portion 72a of FIGS. 10 to 12 may be substantially equally applied to the second leg portion 72b, the third leg portion 72c, and the fourth leg portion 72d.

Referring to FIG. 6, the driving device 110 may include a structure in which the plurality of driving elements 10, 20, 30, 40, and 50 are stacked. In addition, the driving device 110 may further include the housing 70 to provide a space in which the first driving element 10, the second driving element 20, the third driving element 30, the fourth driving element 40, and the fifth driving element 50 are provided.

The housing 70 may have a changing height thereof in the third direction (z-axis direction) as heights of the first driving element 10, the second driving element 20, the third driving element 30, the fourth driving element 40, and the fifth driving element 50 in the third direction (z-axis direction) change. For example, because the heights of the first driving element 10, the second driving element 20, the third driving element 30, the fourth driving element 40, and the fifth driving element 50 in the third direction (z-axis direction) increase, when the height of the housing 70 is the maximum, the housing 70 may have a rectangular parallelepiped shape. As described above, when the housing 70 has the rectangular parallelepiped shape, the driving device 110 may be in a first state. The housing 70 may include an upper surface and a lower surface facing each other, and a plurality of sides surrounding a space between the upper surface and the lower surface. In this case, the height of the plurality of side surfaces of the housing 70 in the third direction (z-axis direction) may vary, and accordingly, the height of the housing 70 in the third direction (z-axis direction) may change.

For example, the housing 70 may include a lower housing 71, an upper housing 73 provided on the lower housing 71, and a connection structure 72 connecting the lower housing 71 and the upper housing 73. The lower housing 71 may have a shape including a bottom surface and a part of side surfaces of the rectangular parallelepiped shape. The upper housing 73 may have a shape including a top surface and a part of side surfaces of the rectangular parallelepiped shape. For example, the lower housing 71 and the upper housing 73 may each have the rectangular parallelepiped shape from which the top surface is removed. The lower housing 71 and the upper housing 73 may be provided to face each other in the third direction (z-axis direction). For example, the lower housing 71 and the upper housing 73 may be provided such that regions from which the top surface is removed face each other. An upper substrate sub1 for supporting an object OBJ may be provided inside the upper housing 73. In addition, the upper substrate sub1 may be provided on the first driving element 10, the second driving element 20, the third driving element 30, the fourth driving element 40, and the fifth driving element 50. A lower substrate sub2 for supporting the first driving element 10, the second driving element 20, the third driving element 30, the fourth driving element 40, and the fifth driving element 50 may be provided inside the lower housing 71.

The connection structure 72 may have a shape including a part of the side surfaces of the housing 70. The connection structure 72 is a structure that connects the lower housing 71 and the upper housing 73, and may allow the lower housing 71 and the upper housing 73 to be spaced apart from each other.

Accordingly, an internal space in which a structure formed by stacking the plurality of driving elements 10, 20, 30, 40 and 50 is to be formed may be formed between the lower housing 71 and the upper housing 73. The lower housing 71, the connection structure 72, and the upper housing 73 may be integrally coupled.

The housing 70 may include a double-layer structure of an inner layer and an outer layer. For example, as shown in FIG. 7, the housing 70 may include a structure in which an inner flexible base layer FL and a shield layer SL on the outer surface of the inner flexible base layer FL are stacked. The housing 70 forming the internal space in which the plurality of driving elements 10, 20, 30, 40 and 50 may be provided and including the lower housing 71, the connection structure 72, and the upper housing 73 may be manufactured by appropriately processing the structure in which the inner flexible base layer FL and the shield layer SL are stacked.

A method of manufacturing the housing 70 by appropriately processing the structure in which the inner flexible base layer FL and the shield layer SL are stacked will be described later with reference to FIGS. 11 and 12.

The internal flexible base layer FL may include at least one of polyimide (PI) and polyethylene terephthalate (PET). The shield layer SL may include at least one of a FR-4 sheet, polyethylene naphthalate (PEN), polyethylene terephthalate (PET), and carbon.

Referring to FIG. 8, unlike the driving device 110 in the first state shown in FIG. 6, when the heights of the first driving element 10, the second driving element 20, the third driving element 30, and the fourth driving element 40 and the fifth driving element 50 in the third direction (z-axis direction) are relatively reduced, the height of the connection structure 72 in the third direction (z-axis direction) may be reduced.

For example, as shown in FIGS. 8 and 9, the connection structure 72 may include at least the four leg portions 72a, 72b, 72c, and 72d configured to be partially folded so that degrees of folding vary as the heights of the first driving element 10, the second driving element 20, the third driving element 30, and the fourth driving element 40 and the fifth driving element 50 in the third direction (z-axis direction) change. For example, the connection structure 72 may include the first leg portion 72a, the second leg portion 72b, the third leg portion 72c, and the fourth leg portion 72d. However, the present disclosure is not limited thereto, and the connection structure 72 may include five or more leg portions.

The first leg portion 72a, the second leg portion 72b, the third leg portion 72c, and the fourth leg portion 72d may correspond to four side surfaces of the rectangular parallelepiped shape included in the housing 70. For example, the first leg portion 72a, the second leg portion 72b, the third leg portion 72c, and the fourth leg portion 72d may correspond to the four side surfaces configured to be folded in the middle.

The first leg portion 72a, the second leg portion 72b, the third leg portion 72c, and the fourth leg portion 72d are folded so that the height of the connection structure 72 in the third direction (z-axis direction) may be reduced. As described above, when the first leg portion 72a, the second leg portion 72b, the third leg portion 72c, and the fourth leg portion 72d are folded, the driving device 110 may be in the second state. Referring to FIG. 9, when the driving device 110 in the second state is viewed from above in the third direction (z-axis direction), the housing 70 may be seen to have a cross shape. This is because the first leg portion 72a, the second leg portion 72b, the third leg portion 72c, and the fourth leg portion 72d are folded to the outer direction of the housing 70.

Referring to FIG. 10, when the first leg portion 72a is folded to the outer direction of the housing 70 by a folding portion a1 formed in a part of the first leg portion 72a, the height of the housing 70 may be reduced. One end of the first leg portion 72a may be connected to the upper housing 73 through a first connection portion a2, and the other end may be connected to the lower housing 71 through a second connection portion a3.

Referring to FIGS. 11 and 12, the first leg portion 72a may include a double-layer structure of an inner layer and an outer layer. For example, the first leg portion 72a may include the structure in which the inner flexible base layer FL and the shield layer SL on the outer surface of the inner flexible base layer FL are stacked. The shield layer SL may include a plurality of sub-shield layers s1 and s2 spaced apart from each other on the outer surface of the inner flexible base layer FL. The first leg portion 72a may include an origami structure formed by folding the inner flexible base layer FL in a spaced region b1 between the plurality of sub-shield layers s1 and s2. In this case, a distance t3 between the plurality of sub-shield layers s1 and s2 may be greater than or equal to a thickness t4 of the shield layer SL. However, the disclosure is not limited thereto, and the distance t3 between the plurality of sub-shield layers s1 and s2 may be smaller than the thickness t4 of the shield layer SL.

Likewise, the first leg portion 72a includes the origami structure, the housing 70 may entirely include the origami structure. For example, the housing 70 may be manufactured when a structure in which the plurality of sub-shield layers s1 and s2 are stacked on the outer surface of the inner flexible base layer FL is folded in the spaced region b1 between the plurality of sub-shield layers s1 and s2. The two sub-shield layers s1 and s2 and the single spaced region b1 are shown in FIGS. 11 and 12, but these are only materials required for manufacturing only the first leg portion 72a. In order to manufacture the housing 70, more than two sub-shield layers corresponding to the bottom and side surfaces of the lower housing 71, the top and side surfaces of the upper housing 73, the second leg portion 72b, the third leg portion 72c, and the fourth leg portion 72d are required. In addition, as the number of sub-shield layers increases, the number of a spaced region in which the inner flexible base layer FL is folded also increases. As described above, the housing 70 may include the connection structure 72 implemented using the foldable inner flexible base layer FL of a light-weight material even without a separate connection structure.

The folded portion a1 of the first leg portion 72a shown in FIG. 10 may be a portion in which the inner flexible base layer FL included in the first leg portion 72a is folded. The first connection portion a2 may be a portion in which the inner flexible base layer FL is folded between a sub-shield layer included in the upper housing 73 and a sub-shield layer included in the first leg portion 72a among a plurality of sub-shield layers included in the housing 70. In addition, the second connection portion a3 may be a portion in which the inner flexible base layer FL is folded between a sub-shield layer included in the lower housing 71 and the sub-shield layer included in the first leg portion 72a among the plurality of sub-shield layers included in the housing 70.

Referring to FIG. 13A, the object OBJ may be positioned at a lower height in a state in which the first leg portion 72a included in the driving device 110 is relatively folded more. Meanwhile, referring to FIG. 13B, the object OBJ may be positioned at a higher height when the first leg portion 72a included in the driving device 110 is relatively folded less. According to an example embodiment, a first height t5 of the first leg portion 72a in the state in which the first leg portion 72a is relatively folded more may be lower than a second height t6 of the first leg portion 72a in the state in which the first leg portion 72a is relatively folded less.

The housing 70 of the driving device 110 of FIG. 6 may prevent an inclination of the structure in which the plurality of driving elements 10, 20, 30, 40, and 50 are stacked, and accordingly, the driving device of FIG. 110 may have improved stability and linear mobility compared to the driving device 100 of FIG. 1. That is, the housing 70 of the driving device 110 of FIG. 6 may prevent the stacked structure made of the plurality of driving elements 10, 20, 30, 40, and 50 from leaning to one side.

Figure 14:
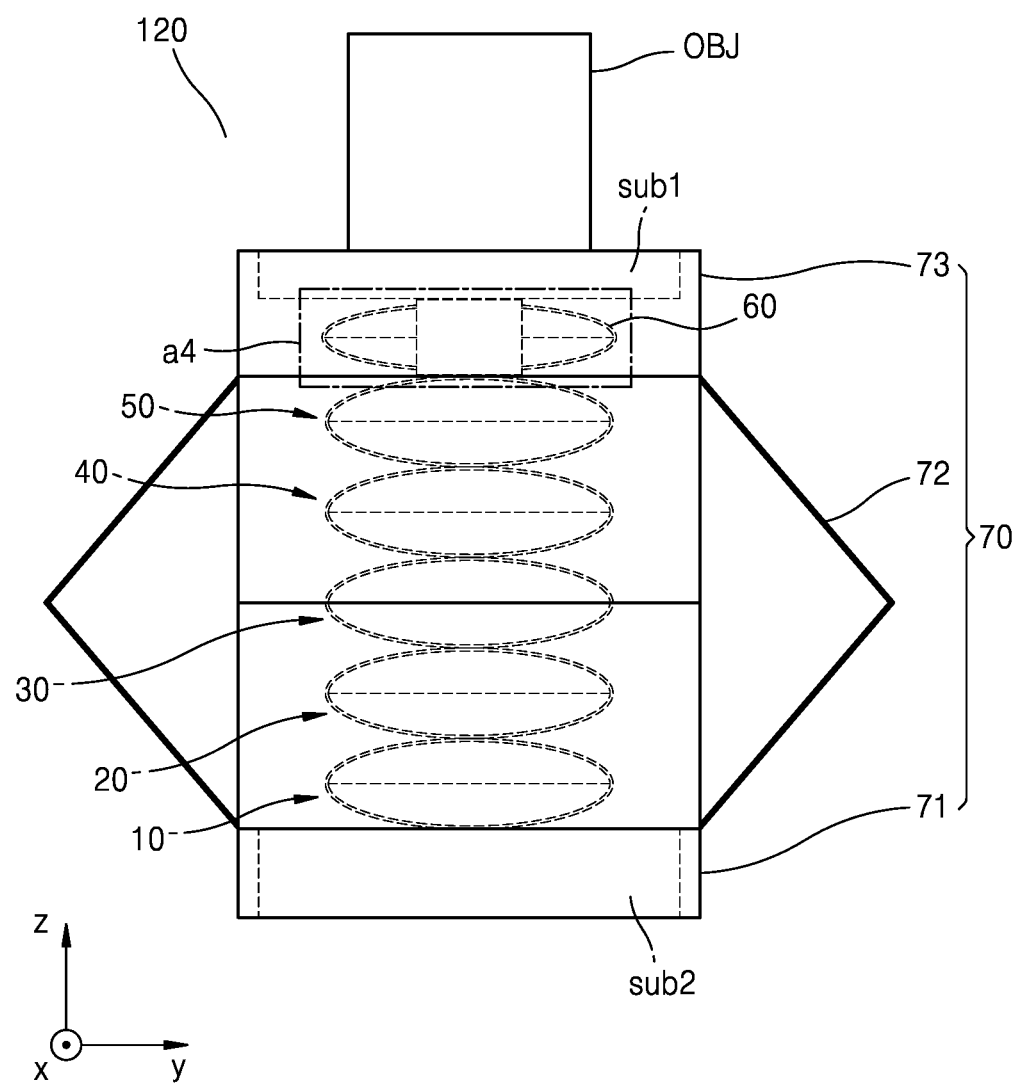
FIG. 14 is a perspective view schematically illustrating a configuration of a driving device according to another example embodiment.
Figure 15A:
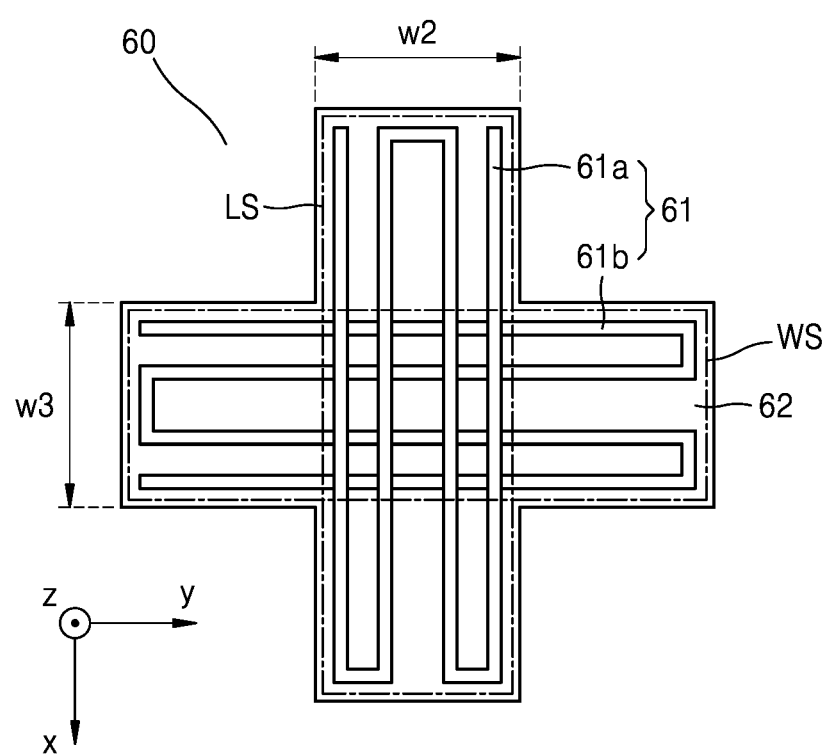
FIGS. 15A and 15B schematically illustrates a configuration of a cross-shaped driving element included in the driving device of FIG. 14, according to another example embodiment.
Figure 15B:
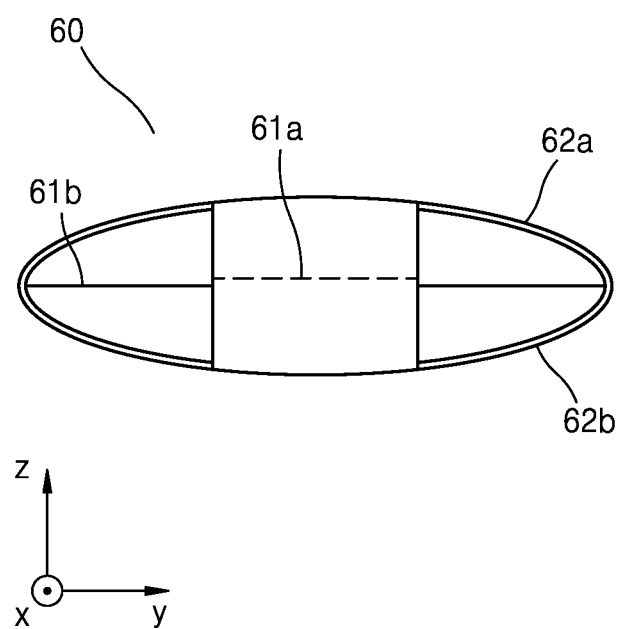

FIG. 14 is a perspective view schematically illustrating a configuration of a driving device 120 according to another embodiment. FIGS. 15A and 15B schematically illustrate a configuration of a cross-shaped driving element 60 included in the driving device 120 of FIG. 14.

The driving device 120 of FIG. 14 may be substantially the same as the driving device 110 of FIG. 6, except that the driving device 120 further includes the cross-shaped driving element 60. With respect to descriptions of FIGS. 14 and 15, the redundant descriptions with those of FIGS. 1 to 13 will be omitted.

Referring to FIG. 14, the driving device 120 may include a structure in which the plurality of driving elements 10, 20, 30, 40, and 50 are stacked. In addition, the driving device 120 may further include the housing 70 to provide a space in which the first driving element 10, the second driving element 20, the third driving element 30, the fourth driving element 40, and the fifth driving element 50 are provided.

The housing 70 may include the lower housing 71, the upper housing 73 provided on the lower housing 71, and the connection structure 72 connecting the lower housing 71 and the upper housing 73.

The upper substrate sub1 for supporting the object OBJ may be provided inside the upper housing 73 The lower substrate sub2 for supporting the first driving element 10, the second driving element 20, the third driving element 30, the fourth driving element 40, and the fifth driving element 50 may be provided inside the lower housing 71.

Meanwhile, the driving device 120 may further include the cross-shaped driving element 60 provided on the first driving element 10, the second driving element 20, the third driving element 30, the fourth driving element 40, and the fifth driving element 50. The cross-shaped driving element 60 may be provided in a lower region a4 of the upper substrate sub1.

Referring to FIGS. 15A and 15B, the cross-shaped driving element 60 may include a cross-shaped flexible structure 62 including an upper flexible sheet 62a and a lower flexible sheet 62b facing each other and having a cross shape and a cross-shaped wire 61 provided in a cross internal space of the cross-shaped flexible structure 62. The cross-shaped wire 61 may include a third wire 61b provided in a width space WS of the cross internal space of the cross-shaped flexible structure 62 and a fourth wire 61a provided in a length space LS of the cross internal space. Both ends of the third wire 61b may support both ends of the cross-shaped flexible structure 62 in the first direction (y-axis direction). Both ends of the fourth wire 61a may support both ends of the cross-shaped flexible structure 62 in the second direction (x-axis direction). The third wire 61b and the fourth wire 61a may each include a shape memory alloy.

The third wire 61b may be formed to extend in the first direction (y-axis direction), and may include a meander pattern formed by connecting a plurality of single wires arranged side by side in the second direction (x-axis direction). The fourth wire 61a may be formed to extend in the second direction (x-axis direction), and may include a meander pattern formed by connecting a plurality of single wires arranged side by side in the first direction (y-axis direction). As described above, the third wire 61b and the fourth wire 61a including wires of the meander pattern may contract significantly more by the same current as compared to a straight wire.

The third wire 61b and the fourth wire 61a may be connected in series. For example, the third wire 61b and the fourth wire 61a may be electrically connected by a connecting wire connecting one end of the third wire 61b and one end of the fourth wire 61a. Accordingly, a current of the same intensity supplied from an external power supply device may flow through the third wire 61b and the fourth wire 61a. The third wire 61b and the fourth wire 61a may be provided on different layers. For example, the third wire 61b may be provided in a lower portion of the fourth wire 61a.

In FIG. 14, the cross-shaped driving element 60 is provided on the first driving element 10, the second driving element 20, the third driving element 30, the fourth driving element 40, and the fifth driving element 50, and is provided in a lower portion of the upper substrate sub1, but is not limited thereto. For example, the cross-shaped driving element 60 may be provided between the first driving element 10 and the second driving element 20. In addition, the cross-shaped driving element 60 may be provided between the second driving element 20 and the third driving element 30, between the third driving element 30 and the fourth driving element 40, or between the fourth driving element 40 and the fifth driving element 50.

Figure 16:
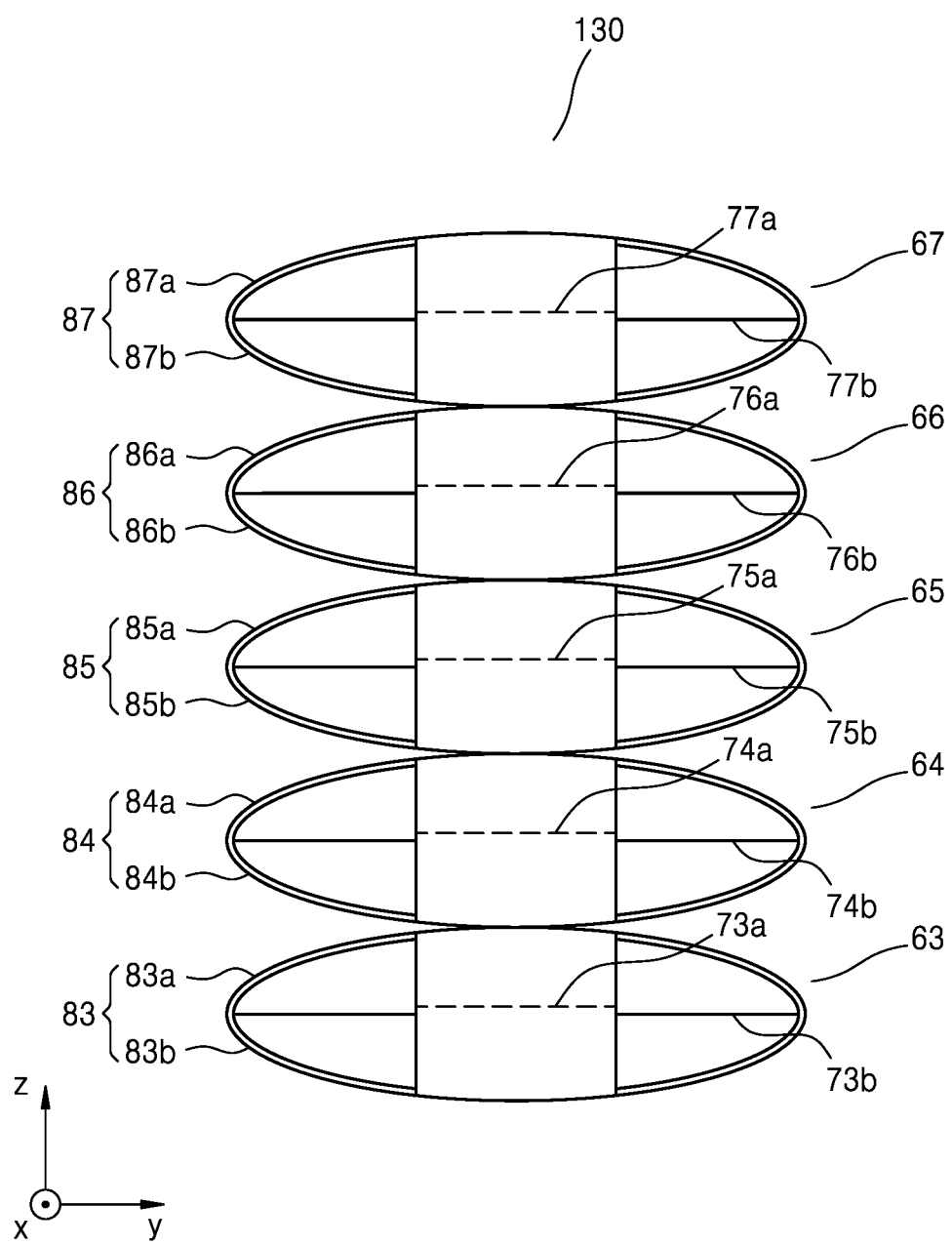
FIG. 16 schematically illustrates a configuration of a driving device according to another example embodiment.

FIG. 16 schematically illustrates a configuration of a driving device 130 according to another example embodiment.

Referring to FIG. 16, the driving device 130 may include a structure in which a plurality of driving elements 63, 64, 65, 66 and 67 are stacked. The plurality of driving elements 63, 64, 65, 66, and 67 may include a first driving element 63, a second driving element 64, a third driving element 65, a fourth driving element 66, and a fifth driving element 67. However, the disclosure is not limited thereto, and the driving device 130 may include more than five driving elements.

A configuration of each of the plurality of driving elements 63, 64, 65, 66 and 67 may be substantially the same as that of the cross-shaped driving element 60 of FIGS. 14 and 15.

The first driving element 63 may include a cross-shaped flexible structure 83 including an upper flexible sheet 83*a* and a lower flexible sheet 83*b* facing each other and having a cross shape, a third wire 73*b* provided in a width space of a cross internal space of the cross-shaped flexible structure 83 and a fourth wire 73*a* provided in a length space of the cross internal space.

Similarly, the second driving element 64 may include the cross-shaped flexible structure 83 including the upper flexible sheet 83*a* and the lower flexible sheet 83*b* having a cross shape, a fifth wire 74*b* and a sixth wire 74*a*. The third driving element 65 may include a cross-shaped flexible structure 85 including an upper flexible sheet 85*a* and a lower flexible sheet 85*b* having a cross shape, a seventh wire 75*b* and an eighth wire 75*a*. The fourth driving element 66 may include a cross-shaped flexible structure 86 including an upper flexible sheet 86*a* and a lower flexible sheet 86*b* having a cross shape, a ninth wire 76*b* and a tenth wire 76*a*. The fifth driving element 67 may include a cross-shaped flexible structure 87 including an upper flexible sheet 87*a* and a lower flexible sheet 87*b* having a cross shape, an 11th wire 77*b* and a twelfth wire 77*a*.

According to various example embodiments of the disclosure, a driving device including a shape memory alloy may be provided.

According to various example embodiments of the disclosure, a driving device that converts a contractile force of the shape memory alloy into a driving force and transmits the driving force to an object.

The driving device according to various example embodiments of the disclosure may include a plurality of driving elements that convert the contractile force of the shape memory alloy into the driving force. The plurality of driving elements may be vertically stacked, and a displacement of the driving device may be amplified according to a stacked structure.

The driving device according to various example embodiments of the disclosure includes a housing of an origami structure supporting a structure in which a plurality of driving elements are stacked, thereby achieving improved stability and linear mobility.

It should be understood that example embodiments described herein should be considered in a descriptive sense only and not for purposes of limitation. Descriptions of features or aspects within each embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A driving device comprising:
a first driving element comprising a first wire and a first flexible structure, the first wire extending in a first direction and comprising a first shape memory alloy, the first flexible structure having a first width in a second direction perpendicular to the first direction, and the first flexible structure configured to have a height increasing in a third direction perpendicular to both the first direction and the second direction based on a contraction of the first wire in the first direction;
a second driving element comprising a second wire and a second flexible structure, the second wire extending in the first direction and comprising a second shape memory alloy, the second flexible structure having a second width in the second direction, and having a height increasing in the third direction based on a contraction of the second wire in the first direction; and
a housing comprising a space in which the first driving element and the second driving element are provided,
wherein the first driving element and the second driving element are stacked in the third direction, and
wherein the housing comprises a structure in which an inner flexible base layer and a shield layer on an outer surface of the inner flexible base layer are stacked.

2. The driving device of claim 1, wherein the first flexible structure is supported by both ends of the first wire in the first direction,
wherein the first flexible structure is configured to surround upper and lower portions of the first wire in the third direction,
wherein the second flexible structure is supported by both ends of the second wire in the first direction, and
wherein the second flexible structure is configured to surround upper and lower portions of the second wire in the third direction.

3. The driving device of claim 2, wherein the first flexible structure comprises openings through which the first wire is exposed to outside in the second direction, and
wherein the second flexible structure comprises openings through which the second wire is exposed to outside in the second direction.

4. The driving device of claim 1, wherein the first flexible structure comprises a first upper flexible sheet and a first lower flexible sheet supported by both ends of the first wire in the first direction,
wherein the first upper flexible sheet covers an upper portion of the first wire in the third direction,
wherein the first lower flexible sheet covers a lower portion of the first wire in the third direction,
wherein the second flexible structure comprises a second upper flexible sheet and a second lower flexible sheet supported by both ends of the second wire in the first direction,
wherein the second upper flexible sheet covers an upper portion of the second wire in the third direction, and
wherein the second lower flexible sheet covers a lower portion of the second wire in the third direction.

5. The driving device of claim 4, wherein at least one first protrusion is formed on each end of one of the first upper flexible sheet and the first lower flexible sheet in the first direction, and at least one first insertion hole into which the at least one first protrusion is inserted is formed in each end of the other one in the first direction, and wherein at least one second protrusion is formed on each end of one of the second upper flexible sheet and the second lower flexible sheet in the first direction, and at least one second insertion hole into which the at least one second protrusion is inserted is formed in each end of the other one in the first direction.

6. The driving device of claim 1, wherein the first flexible structure and the second flexible structure each comprise an insulating flexible material.

7. The driving device of claim 1, further comprising a power supply device configured to supply power to the first driving element and the second driving element so that the first wire and the second wire contract in the first direction.

8. The driving device of claim 1, further comprising a connection conducting wire configured to electrically connect the first wire to the second wire.

9. The driving device of claim 7, wherein the power supply device is configured to independently apply the power to the first driving element and the second driving element.

10. The driving device of claim 1,
wherein, based on a change in heights of the first flexible structure and the second flexible structure in the third direction, a height of the housing changes in the third direction.

11. The driving device of claim 10,
wherein the shield layer comprises a plurality of sub-shield layers spaced apart from each other on the outer surface of the inner flexible base layer, and
wherein the housing comprises an origami structure formed by folding the inner flexible base layer in a spaced region between the plurality of sub-shield layers.

12. The driving device of claim 10, wherein the inner flexible base layer comprises at least one of polyimide (PI) and polyethylene terephthalate (PET).

13. The driving device of claim 10, wherein the shield layer comprises at least one of an FR-4 sheet, polyethylene naphthalate (PEN), polyethylene terephthalate (PET), and carbon.

14. The driving device of claim 10, wherein the housing comprises a lower housing, an upper housing on the lower housing, and a connection structure connecting the lower housing and the upper housing, and
wherein the connection structure has a height changing in the third direction based on the change in the heights of the first flexible structure and the second flexible structure in the third direction.

15. The driving device of claim 14, wherein the connection structure comprises at least four leg portions configured to be partially folded so that degrees of folding vary based on a change in heights of the first driving element and the second driving element in the third direction change.

16. The driving device of claim 14, further comprising an upper substrate provided on the first driving element and the second driving element and inside the upper housing to support an object, and a lower substrate provided to support the first driving element and the second driving element and inside the lower housing.

17. The driving device of claim 10, further comprising a third driving element provided on the first driving element and the second driving element and inside the housing,
wherein the third driving element comprises a cross-shaped flexible structure comprising an upper flexible sheet and a lower flexible sheet facing each other and each having a cross shape, a third wire provided in a width space of a cross internal space of the cross-shaped flexible structure, and a fourth wire provided in a length space of the cross internal space.

18. The driving device of claim 17, wherein each of the third wire and the fourth wire comprises a meander pattern.

19. The driving device of claim 1, wherein the first driving element and the second driving element are each implemented as a cross-shaped driving element, the first driving element further comprises a third wire intersecting the first wire, and the second driving element further comprises a fourth wire intersecting the second wire, and
wherein the first flexible structure and the second flexible structure each have a cross shape in the first direction and the second direction, the first wire and the third wire are respectively provided in a length space and a width space of the first flexible structure, and the second wire and the fourth wire are respectively provided in a length space and a width space of the second flexible structure.

20. The driving device of claim 19, wherein each of the first wire, the second wire, the third wire, and the fourth wire comprises a meander pattern.

21. A driving device comprising:
one or more driving elements; and
a housing comprising a space in which the one or more driving elements are provided,
wherein the housing comprises a structure in which an inner flexible base layer and a shield layer on an outer surface of the inner flexible base layer are stacked,
wherein each of the one or more driving elements comprises:
a wire extending in a first direction and comprising a first shape memory alloy, and
a flexible structure having an upper portion provided above the wire, and a lower portion provided below the wire, and
wherein a first end of the wire is connected to the flexible structure at a first position, and a second end of the wire is connected to the flexible structure at a second position,
wherein the flexible structure is configured to expand or contract in a second direction based on a contraction or expansion of the wire in the first direction.

22. A driving device comprising:
a power supply;
one or more driving elements, each comprising:
a wire extending in a first direction and comprising a first shape memory alloy, and
a flexible structure having an upper portion provided above the wire, and a lower portion provided below the wire;
a housing comprising a space in which the one or more driving elements are provided; and
a controller configured to supply from the power supply to the wire,
wherein the flexible structure is configured to expand or contract in a second direction based on a contraction or an expansion of the wire in the first direction,
wherein the contraction or the expansion of the wire in the first direction is based on a flow of current through the wire based on the power supply, and
wherein the housing comprises a structure in which an inner flexible base layer and a shield layer on an outer surface of the inner flexible base layer are stacked.

* * * * *